(No Model.) 2 Sheets—Sheet 1.

C. A. SHALER.
WHEEL PLOW.

No. 351,218. Patented Oct. 19, 1886.

Witnesses:
James F. Duhamel
Walter S. Dodge

Clarence A. Shaler
Inventor
by Dodge & Son
his Attys (No Model.) 2 Sheets—Sheet 2.

C. A. SHALER.
WHEEL PLOW.

No. 351,218. Patented Oct. 19, 1886.

Witnesses:
James P. DuHamel
Walter S. Dodge

Clarence A. Shaler,
Inventor,
by Dodger Son,
his Attys.

UNITED STATES PATENT OFFICE.

CLARENCE ADDISON SHALER, OF FOX LAKE, WISCONSIN.

WHEEL-PLOW.

SPECIFICATION forming part of Letters Patent No. 351,218, dated October 19, 1886.

Application filed June 15, 1886. Serial No. 205,239. (No model.)

*To all whom it may concern:*

Be it known that I, CLARENCE ADDISON SHALER, of Fox Lake, in the county of Dodge and State of Wisconsin, have invented certain new and useful Improvements in Wheeled Plows, of which the following is a specification.

My invention relates to plows adapted to be used at will, either as a walking or a riding plow; and it consists in features and details hereinafter fully described.

Figure 1:
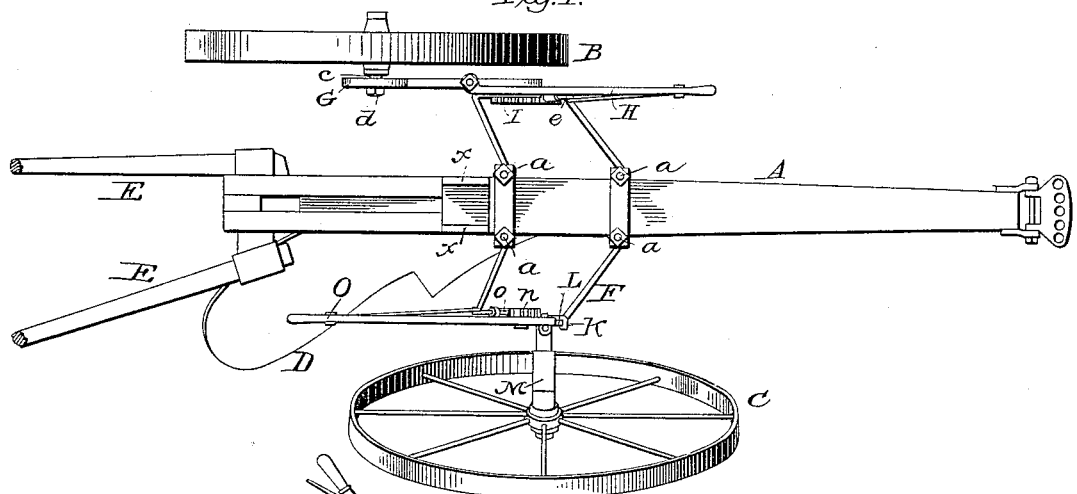
Figure 2:
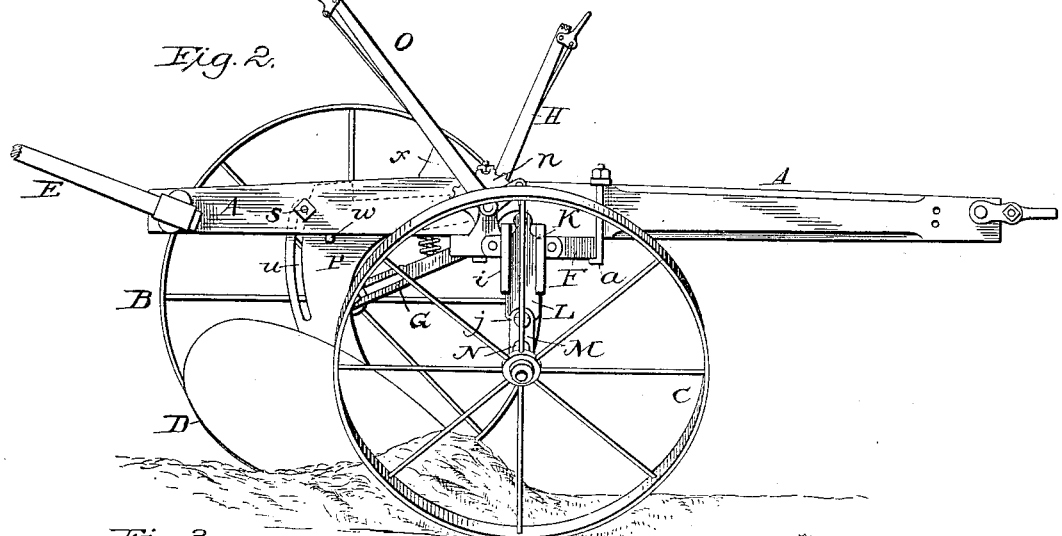
Figure 3:
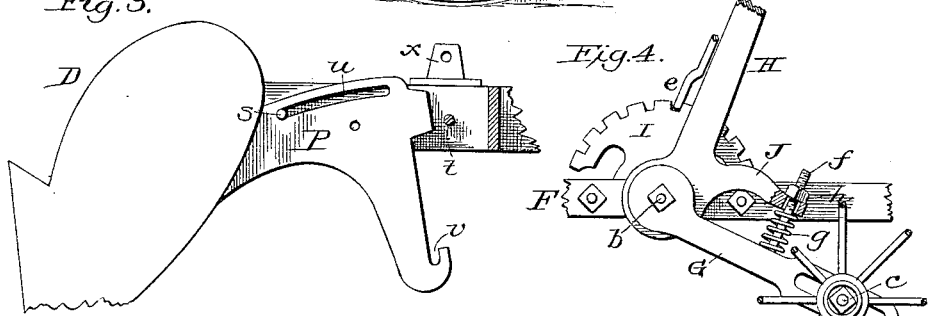
Figure 4:
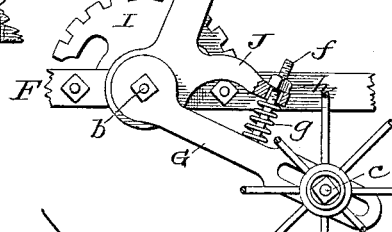
Figure 5:
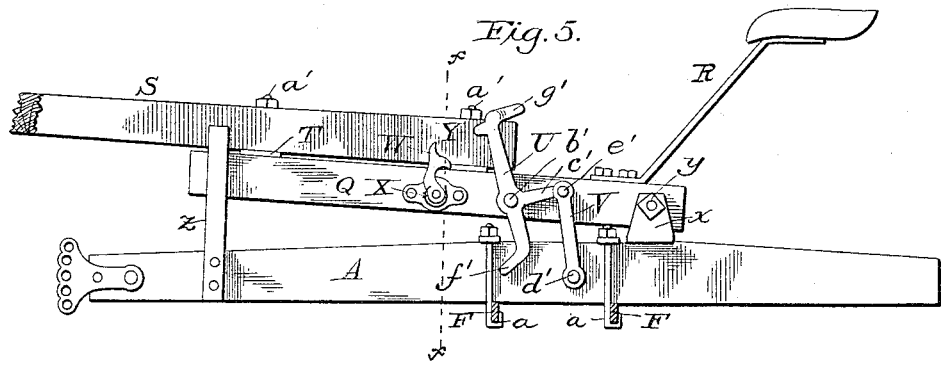
Figure 6:
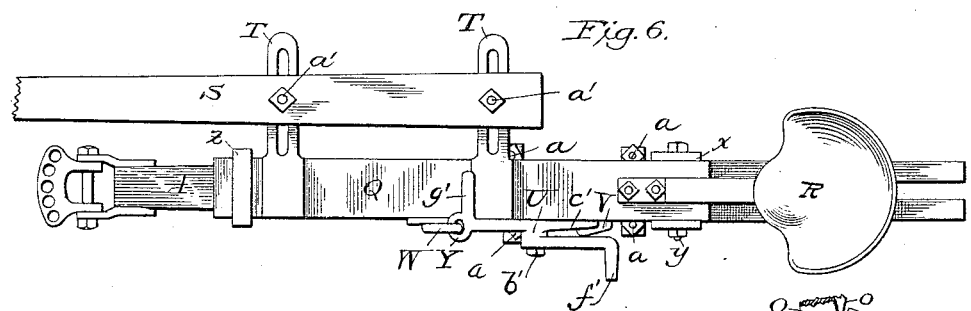
Figures 7, 8, 9:
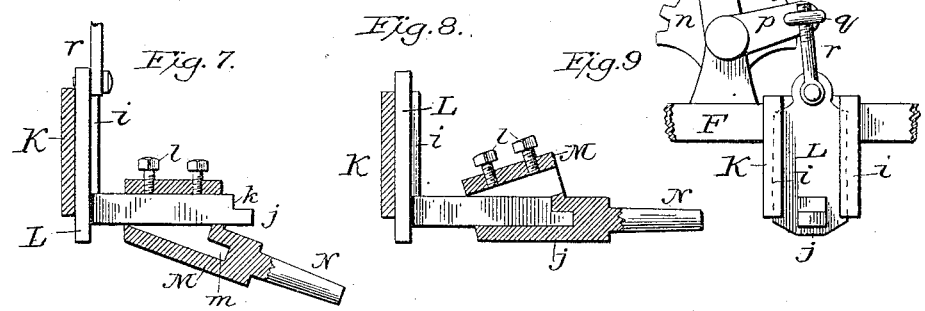
Figure 10:
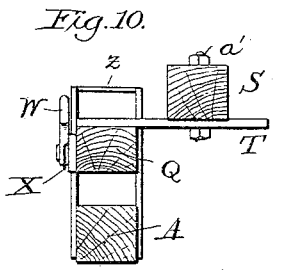

In the drawings, Figure 1 is a top plan view of my improved plow in use as a walking-plow; Fig. 2, a side view of the same; Fig. 3, an enlarged view, showing the manner in which the plow-standard is pivoted and allowed to yield in meeting with an obstruction; Fig. 4, an enlarged detail view, showing the mechanism by which the land-wheel is raised and lowered, and allowed to rise and fall after it has been adjusted in position. Figs. 5 and 6 are views illustrating the manner of attaching the tongue and seat when the plow is used as a riding-plow; Figs. 7, 8, and 9, detail views showing the mechanism by which the position of the furrow-wheel may be changed or varied; Fig. 10, a section on the line $x\ x$, Fig. 5.

The objects of my invention are, first, to construct an easy-running plow by so placing the two wheels that the strain comes upon them direct; second, to so balance the plow, by placing one wheel behind the other, that pressure up or down upon the handle will run the plow out of or into the ground, the same as an ordinary walking-plow; third, to provide the sulky attachment with means for producing the results last-above described; fourth, to furnish a plow that may be readily convertible into either a riding or walking plow; fifth, to provide means for varying the position of the land-wheel; sixth, to provide means for varying or changing the position of the furrow-wheel; and, seventh, to allow the plow-standard to yield when meeting with an obstruction, and thereby relieve the machine of strain. These objects are accomplished by the construction shown in the drawings, in which—

A indicates the plow-beam; B, the land-wheel; C, the furrow-wheel; D, the plow, and E E the handles, all as clearly shown in Figs. 1 and 2.

As shown in Figs. 1, 2, and 5, a metal frame, F, is secured to the beam A by means of bolts $a$, which are hooked at their lower ends and engage under the frame. The land-wheel B is carried at the end of an arm, G, pivoted to the frame F, as shown in Figs. 1 and 4, by means of a bolt, $b$. The arm G is slotted at its outer end, as shown, to receive the axle $c$ of wheel B, and it will be seen that the wheel B may be moved nearer to or farther from the front of the plow, as desired, and held at any desired adjustment by a nut, $d$, screwed onto the inner end of the axle $c$, as shown in Fig. 1. The arm G is loose upon the bolt or pivot $b$, and free to rise and fall, except as prevented by means hereinafter described. Loosely journaled upon the bolt or pivot $b$ is a hand-lever, H, provided with a locking dog or pawl, $e$, which engages with a curved rack, I, secured to the frame F, as shown in Fig. 4. The hand-lever H is provided with an arm, J, which extends over the arm G for a short distance, and which is perforated to receive a pin, $f$, rigidly secured to and projecting upward from the arm G. Between the arms G and J the pin $f$ is encircled by a spiral spring, $g$, while above the arm J the pin is threaded to receive a nut, $h$, as clearly shown in Fig. 4. By this construction it will be seen that as the wheel B passes over an obstruction it may compress the spring $g$ and rise without affecting the depth of the plow in the ground; and it will also be seen that by adjusting the nut $h$ the spring can be adjusted to adapt the plow to rough or smooth ground. By throwing the hand-lever H backward or forward the depth of cut will be decreased or increased.

Bolted or otherwise secured to the frame F, on the side near the furrow-wheel, is a plate or guide, K, formed with vertical undercut flanges $i$, as shown in Figs. 1, 2, and 7, and in which slides a plate or block, L. This block L is provided with a squared arm, $j$, which extends outwardly from the lower end of the block, at right angles thereto, as shown in Figs. 7 and 8, and reduced in size and shouldered near its outer end, as at $k$.

M indicates a hollow block, which fits upon the squared arm $j$, and is held thereon by means of the set-screws $l$, as clearly shown in Fig. 7, the block M being thereby made adjustable longitudinally upon the arm $j$. The block M is provided with an oblique stud or axle, N, which is so inclined as to give the proper inclination to wheel C and cause it to run in the corner or angle of the furrow. In line with the axle N, within the block M, is a socket, $m$, which, as shown in Fig. 8, is adapted to fit securely upon the arm $j$. From this construction it follows that the width of cut may be varied by moving the block M lengthwise upon the rod or arm $j$; and it will also be seen that by removing the block M from the position shown in Fig. 7 and inserting it upon the arm $j$, as shown in Fig. 8, the axle N will be horizontal and the plow adapted to be moved readily from place to place.

The set-screws $l$, instead of being in the top of the socket-block M, may be placed upon one side, as shown by the dotted line in Fig. 8, so as to hold the block M upon the arm $j$ when the block is upon the arm, as in Fig. 8.

O represents a hand-lever pivoted to a curved rack, $n$, bolted to the frame F, the hand-lever being provided with a locking pawl or dog, $o$, to engage with the rack and hold the lever at any desired adjustment. The lever O is further provided with a forwardly-extending arm, $p$, having at its outer end a lug, $q$, and screwing into this lug is a rod, $r$, which in turn is pivotally connected to the upper end of the sliding block or plate L, as shown in Fig. 9. By means of this hand-lever O the wheel C may be raised and lowered vertically and held in any desired position. The screwed rod $r$ permits a nicety of adjustment which cannot be secured by the ratchet or rack $n$, and it also permits of the hand-lever to be thrown forward or back to bring it in reach when riding or walking.

As shown in Figs. 1 and 3, the rear end of the plow-beam is made in two parts or slotted to receive the plow-standard P, the standard being held in place by means of bolts $s$ and $t$, the former passing through a curved slot, $u$, eccentric to bolt $t$, and the latter adapted to receive a hook, $v$, formed upon the forward end of the standard. Passing transversely through the plow-standard and bearing upon the under side of the beam A is a wooden pin, $w$, which, when the plow meets with an obstruction likely to damage the machine, breaks and allows the plow to tip or rock, as shown in Fig. 3. When the plow thus swings upon the bolt $s$, the hook $v$ is thrown off the bolt $t$, as the top of the curved slot $u$ is nearer the bolt $t$ than is the lower end of the slot. This broad idea of using a wooden pin which shall break and allow the plow to yield when meeting with an obstruction is not claimed by me, as it is old and well known. By means of the bolt $s$ the plow may be regulated or adjusted so as to slip or yield easier or harder, as desired. By securing the plow by means of two bolts, $s$ and $t$, the plow is permitted to swing back farther than if it were pivoted at one point, and by the employment of the slot $u$ the radius of revolution of the plow-point is shortened, thereby preventing the raising or throwing up of the plow-beam, such as would occur if the upper end of the slot were used as the pivot or center of motion.

Referring now to Figs. 5 and 6, the devices by which the plow is converted into a sulky-plow will be explained.

Upon the beam A are two upright plates, $x$, to which, by means of a bolt, $y$, a beam or false tongue, Q, is pivoted, the latter extending over the beam A throughout the greater part of its length, and guided at its forward free end by a loop, $z$, secured to the beam. At the rear end of false tongue Q is the driver's seat R, which is bolted or otherwise rigidly secured to the beam Q.

S indicates the tongue proper, secured to arms T, projecting laterally from the side of the false tongue Q, the arms T being slotted to receive bolts $a'$, passing vertically through the tongue and the arms.

U indicates a lever pivoted midway of its length by means of a bolt, $b'$, to the false tongue Q, as shown in Fig. 5, and this lever is further provided with an arm, $c'$, radial to the bolt $b'$, as shown. A link, V, pivoted at its lower end by means of a bolt, $d'$, to the plow-beam, is pivotally connected to the radial arm $c'$ by means of bolt or pin $e'$. The lower extremity of lever U is extended laterally to form a foot-piece, $f'$, while the upper end is extended in the reverse direction to form a similar foot-piece, $g'$, as clearly shown in Figs. 5 and 6.

Upon the forward face of the lever U, near its upper end, is formed an eye or loop, Y, which is adapted to receive a hook, W, pivoted to the side of the false tongue Q, the hook being provided with a spring, X, which holds the hook in engagement with the lever.

When it is desired to raise the plow out of the ground, the operator presses with his foot upon the foot-piece $g'$, thereby drawing the false tongue Q and plow-beam A together and tilting the point of the plow upward, so as to readily run out of the ground; and when it is desired to reverse this operation the operator presses upon the foot-piece $f'$, separating the beams Q A and tilting the plow-point downward into the ground. When upon the road, the lever U is pressed forward at its upper end, so as to allow the hook W to engage with the loop or eye V, and thereby firmly lock the false tongue Q and beam A together. By thus tilting or rocking the plow-beam A upward at its forward end upon the bolt $y$ as a pivot the land-wheel is caused to run upon the ground, although the plow has run out of the ground, because the furrow-wheel is in advance of the pivot $y$, while the land-wheel is in rear thereof.

I desire to state that I do not claim, broadly, the plow-beam and tongue pivoted one to the other.

By means of the slotted arms T the tongue may be moved laterally to adapt it for use with two or three horses.

Upon reference to Figs. 1, 2, and 5 it will be seen that by loosening the hook-shaped bolts $a$ the frame F may be set at varying inclinations upon the beam A, and thus insure the proper alignment of the wheels to correspond with the line of draft.

I am aware that it is not new to place one wheel in advance of the other, and that it is old to adjust both wheels vertically, and these features, separately considered, are not broadly new.

Having thus described my invention, what I claim is—

1. In a plow, the combination, with a framing, of an arm, G, journaled thereon and slotted at its outer end, a land-wheel, B, an axle, $c$, for said wheel, adjustable within the slot, a nut, $d$, for clamping said axle in place, and a hand-lever journaled upon the frame separate from the arm for raising the latter.

2. In a wheeled plow, the combination, with a framing, of an arm journaled thereon, a land-wheel carried at the outer end of said arm, a hand-lever also journaled upon the frame, a sliding connection between the arm and the lever, and a spring bearing upon the arm and the lever, substantially as shown.

3. In combination with beam A, frame F, and arm G, wheel B, carried by said arm, lever H, provided with a locking device and with an arm, J, a rod or stem, $f$, secured to arm G and passing freely through the arm J, and a spring, $g$, encircling the stem $f$, substantially as shown and described.

4. In a wheeled plow, the combination, with a beam, of the framing F, constructed substantially as shown, and the hook-shaped bolts $a$, securing the framing to the beam, substantially as described.

5. In a plow, the combination, with a beam, of the plow D, having standard P, the latter provided with hook $v$, eccentric slot $u$, and wooden pin $w$, and bolts $s$ $t$, adapted to engage with the slot and hook, respectively.

6. In a plow, the combination, with a framing, of a guide, K, secured thereto and provided with flanges $i$, a plate, L, sliding upon the guide and provided with angular stud $j$, and the removable axle-socket M, all arranged substantially as shown.

7. In a plow, the combination, with a frame, of a plate, K, a slide, L, mounted therein, a wheel, C, carried by the slide, and an elbow-lever, O, pivoted to the frame and connected to the slide by means of the adjustable link or rod $r$.

8. In a plow, the combination, with a frame, of plates K L, the latter provided with arm $j$, socket-piece M, provided with axle N and adjustable upon the arm $j$, as and for the purpose set forth.

9. In a plow, and in combination with a stud or arm, $j$, the removable socketed block M, provided with a socket to fit upon the arm $j$, with an inclined axle, N, and with a socket, $m$, in line with the axle, as and for the purpose set forth.

10. The socketed axle-block M, provided with angling axle N, and with two sockets, one in line with and the other at an angle to the axle.

11. In a wheeled plow, the combination, with a beam, A, of a second beam, Q, pivoted at its rear end to the beam A, and a tongue, S, secured to the second beam, Q, substantially as shown.

12. In a wheeled plow, the combination, with the plow-beam A, and the beam Q, pivoted at its rear end to the beam A, of a lever, U, pivoted to beam Q in advance of its point of attachment to beam A, an arm projecting from said lever, a link, V, connecting the arm and the beam A, and a tongue, S, all combined and arranged to operate in substantially the manner described.

13. In a wheeled plow, the combination, with the beams A Q, arranged substantially as shown, of a lever, U, pivoted to beam Q, and connected to beam A by means of a link, V, an eye or loop, Y, formed upon the forward face of the lever U, and a hook, W, secured to beam Q and adapted to engage and hold the lever U when the same is tipped forward.

14. In combination with a plow-beam, a plow-standard, P, provided with a forwardly-extending hook, $v$, a bolt, $t$, passing through the beam and adapted to engage the hook, a slot, $u$, in the plow-standard eccentric to bolt $t$, and a bolt, $s$, passing through the beam and the slot, as and for the purpose set forth.

CLARENCE ADDISON SHALER.

Witnesses:
J. F. TUTTLE,
JOHN HOTCHKISS.